United States Patent
Oohigashi et al.

(10) Patent No.: US 10,408,549 B2
(45) Date of Patent: Sep. 10, 2019

(54) HEAT EXCHANGER, HOT WATER APPARATUS, AND METHOD OF MANUFACTURING HEAT EXCHANGER

(71) Applicant: NORITZ CORPORATION, Hyogo (JP)

(72) Inventors: Takeshi Oohigashi, Kakogawa (JP); Satoshi Yoshida, Nishinomiya (JP); Akinobu Nakamura, Himeji (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 15/826,008

(22) Filed: Nov. 29, 2017

(65) Prior Publication Data

US 2018/0164046 A1   Jun. 14, 2018

(30) Foreign Application Priority Data

Dec. 14, 2016   (JP) ................. 2016-242044

(51) Int. Cl.
| | |
|---|---|
| *F28F 1/32* | (2006.01) |
| *F24H 8/00* | (2006.01) |
| *F24H 1/14* | (2006.01) |
| *B23P 15/26* | (2006.01) |
| *F28F 21/08* | (2006.01) |

(Continued)

(52) U.S. Cl.
CPC ............. *F28F 1/325* (2013.01); *B23P 15/26* (2013.01); *F24H 1/145* (2013.01); *F24H 8/00* (2013.01); *F28D 1/0426* (2013.01); *F28D 1/05325* (2013.01); *F28D 1/05375* (2013.01); *F28F 21/083* (2013.01); *F28F 2275/04* (2013.01); *Y02B 30/102* (2013.01)

(58) Field of Classification Search
CPC ....................................... F28F 1/325
See application file for complete search history.

(56) References Cited

U.S. PATENT DOCUMENTS 3,251,410 A * 5/1966 Raskin ............... F25B 39/02
 165/177
5,934,086 A * 8/1999 Abe ................... F25B 15/02
 62/108

(Continued)

FOREIGN PATENT DOCUMENTS

EP    0825406 A2 *  2/1998  ............... F28F 1/24
EP    1 098 156 A1    5/2001
(Continued)

OTHER PUBLICATIONS

JP2001241688A—machine translation.*

*Primary Examiner* — Nathaniel Herzfeld
(74) *Attorney, Agent, or Firm* — Studebaker & Brackett PC

(57) ABSTRACT

A fin has a plurality of insertion holes in an elliptical shape through which a heat transfer tube is inserted and contains stainless steel as a material. The plurality of insertion holes are disposed as being aligned in a single row in a first direction. The fin has a first slit extending from a first end portion toward a second end portion and a second slit extending from the second end portion toward the first end portion. The second slit has a first edge portion where a cut and raised wall portion is disposed and a second edge portion where no cut and raised wall portion is disposed.

11 Claims, 8 Drawing Sheets

(51) Int. Cl.
*F28D 1/04* (2006.01)
*F28D 1/053* (2006.01)

(56) References Cited

U.S. PATENT DOCUMENTS

| | | | |
|---|---|---|---|
| 6,209,201 B1 * | 4/2001 | Yamada | B21D 53/02 29/890.043 |
| 2011/0030932 A1 * | 2/2011 | Tucker | B21D 53/08 165/151 |
| 2014/0190425 A1 * | 7/2014 | Oohigashi | F24H 9/0031 122/18.4 |
| 2016/0273850 A1 * | 9/2016 | Okamoto | F28F 21/083 |

FOREIGN PATENT DOCUMENTS

| | | | | |
|---|---|---|---|---|
| JP | 06194084 A | * | 7/1994 | |
| JP | H06-41085 Y2 | | 10/1994 | |
| JP | 2001-165588 A | | 6/2001 | |
| JP | 2001241688 A | * | 9/2001 | F28F 1/32 |
| JP | 2003014308 A | * | 1/2003 | |

* cited by examiner

HEAT EXCHANGER, HOT WATER APPARATUS, AND METHOD OF MANUFACTURING HEAT EXCHANGER

BACKGROUND OF THE INVENTION

Field of the Invention

The present invention relates to a heat exchanger, a hot water apparatus, and a method of manufacturing a heat exchanger.

Description of the Background Art

Japanese Patent Laying-Open No. 2001-165588 and Japanese Utility Model Publication No. 6-41085 disclose conventional heat exchangers.

Japanese Patent Laying-Open No. 2001-165588 describes inserting a heat transfer tube in an elliptical shape from a slit portion provided in a fin in a direction in parallel to a surface of the fin and fixing the heat transfer tube.

Japanese Utility Model Publication No. 6-41085 describes inserting a circular heat transfer tube in a through hole provided in a fin in a direction orthogonal to a surface of the fin and fixing the heat transfer tube.

SUMMARY OF THE INVENTION

In Japanese Patent Laying-Open No. 2001-165588, the heat transfer tube is inserted from the slit portion in the direction in parallel to the surface of the fin. Therefore, the heat transfer tube passes through the slit portion while it pushes out the fin and the fin tends to warp.

In Japanese Utility Model Publication No. 6-41085, a straightening vane which is erected from a main surface of the fin is disposed only on one side of the fin. The straightening vane deflects a flow of hot gas in a direction along a surface of a water pipe and efficiency in heat exchange is improved. With the straightening vane, however, when the heat transfer tube is inserted in the fin, one side of the fin is restricted by the straightening vane and more resistant to expand than the other side. Consequently, the fin tends to warp.

When the fin warps, a pitch between a plurality of heat transfer tubes inserted in the fin is different from a designed value and it becomes difficult to assemble the heat transfer tube to other members.

The present invention was made in view of the problems above, and an object thereof is to provide a heat exchanger which ensures high efficiency in heat exchange and is capable of achieving suppressed warpage of a fin in insertion of a heat transfer tube in the fin, a hot water apparatus, and a method of manufacturing a heat exchanger.

A heat exchanger according to the present invention includes a heat transfer tube and a fin. The fin has a plurality of insertion holes in a circular shape through which the heat transfer tube is inserted and contains stainless steel as a material. The plurality of insertion holes are disposed as being aligned in a single row in a first direction. The plurality of insertion holes include a first insertion hole and a second insertion hole adjacent to each other. The fin has a first end portion and a second end portion opposed to each other in a second direction intersecting with the first direction. The fin has a first slit extending from the first end portion toward the second end portion and a second slit extending from the second end portion toward the first end portion. The second slit has a first edge portion where a cut and raised wall portion is disposed and a second edge portion where no cut and raised wall portion is disposed.

The circular shape encompasses a shape of a perfect circle and an elliptical shape.

According to the heat exchanger in the present invention, the second slit has a cut and raised wall portion. Therefore, the cut and raised wall portion can deflect a flow of combustion gas for heating in a direction along a surface of the heat transfer tube. Efficiency in heat exchange is thus improved.

The second slit has a second edge portion where no cut and raised wall portion is disposed. Therefore, when the heat transfer tube is inserted in the insertion hole, the fin is less likely to be restricted by the cut and raised wall portion and tends to extend at the second end portion. The fin can thus extend substantially equally on a side of the first end portion and a side of the second end portion. Extension as being uneven between the side of the first end portion and the side of the second end portion can be suppressed. Therefore, warpage of the fin is suppressed and assembly of the heat exchanger is facilitated.

As above, warpage of the fin in insertion of the heat transfer tube in the fin can be suppressed while high efficiency in heat exchange is ensured.

In the heat exchanger, the first slit has a tip end located on a side of the second end portion relative to a centerline which connects a center of the circular shape of the first insertion hole and a center of the circular shape of the second insertion hole to each other.

With the first end portion being disposed upstream from the second end portion in a flow of the combustion gas for heating, the combustion gas for heating is more likely to exchange heat with a medium in the heat transfer tube.

In the heat exchanger, the second slit has a tip end located in a region lying between the first insertion hole and the second insertion hole.

When the heat transfer tube is inserted in the insertion hole in the fin, the second slit is thus more likely to accommodate deformation of the fin.

In the heat exchanger, the second slit has the first edge portion located closer to the second end portion than the second edge portion of the second slit.

The cut and raised wall portion of the second slit can allow more effective contact of the combustion gas for heating with the heat transfer tube and efficiency in heat exchange can be improved.

In the heat exchanger, the first edge portion has a curved front shape which projects from the second end portion toward the first end portion.

A height of projection of the cut and raised wall portion can thus be great while a width of a tip end portion of the second slit is kept small.

In the heat exchanger, a burring wall portion is disposed around each of the plurality of insertion holes. When a virtual straight line which extends in the first direction and passes through the center of the circular insertion hole and a virtual normal which passes through the center of the circular insertion hole and is orthogonal to the virtual straight line are assumed, the burring wall portion has a notch in a portion where the virtual normal passes.

When the heat transfer tube is press-fitted into the insertion hole in the fin, the burring wall portion spreads as being divided into two parts with the notch being defined as a boundary so that resistance in press-fitting of the heat transfer tube can be lowered.

In the heat exchanger, the fin has a recess recessed from an edge of the fin toward the insertion hole in a portion where the virtual normal passes.

The recess facilitates application of a brazing material directly above the insertion hole. The brazing material flows down from the recess so that joint between the heat transfer tube inserted through the insertion hole and the fin with the brazing material is facilitated.

In the heat exchanger, a width along the first direction at a tip end portion of the first slit is set to be equal in dimension to a width along the first direction at a tip end portion of the second slit.

Design is thus facilitated.

A hot water apparatus according to the present invention includes the heat exchanger described above and a burner which generates combustion gas for heating with which heat is exchanged by the heat exchanger.

According to the hot water apparatus in the present invention, warpage of the fin in insertion of the heat transfer tube in the fin can be suppressed. A hot water apparatus which is readily assembled can thus be realized.

A method of manufacturing a heat exchanger according to the present invention is a method of manufacturing the heat exchanger described above, and the method includes press-fitting the heat transfer tube in the insertion hole in the fin and brazing the heat transfer tube to the fin.

According to the method of manufacturing a heat exchanger in the present invention, warpage of the fin in insertion of the heat transfer tube in the fin can be suppressed. A heat exchanger which is readily assembled can thus be realized.

In the method of manufacturing a heat exchanger, the fin is prepared to have a burring wall portion around each of the plurality of insertion holes and to have a recess. When a virtual straight line which extends in the first direction and passes through the center of the circular shape of the insertion hole and a virtual normal which passes through the center of the circular shape and is orthogonal to the virtual straight line are assumed, the burring wall portion is formed to have a notch in a portion where the virtual normal passes. The recess is formed to be recessed from an edge of the fin toward the insertion hole in a portion where the virtual normal passes. The brazing the heat transfer tube includes feeding a brazing material from the recess through the notch in the burring wall portion to a portion in between the heat transfer tube and the fin.

The recess thus facilitates application of a brazing material directly above the insertion hole. The brazing material flows down from the recess through the notch in the burring wall portion to a portion in between the heat transfer tube and the fin so that joint between the heat transfer tube inserted through the insertion hole and the fin with the brazing material is facilitated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described below with reference to the drawings.

A construction of a hot water apparatus in one embodiment of the present invention will initially be described with reference to FIG. 1.

Figure 1:
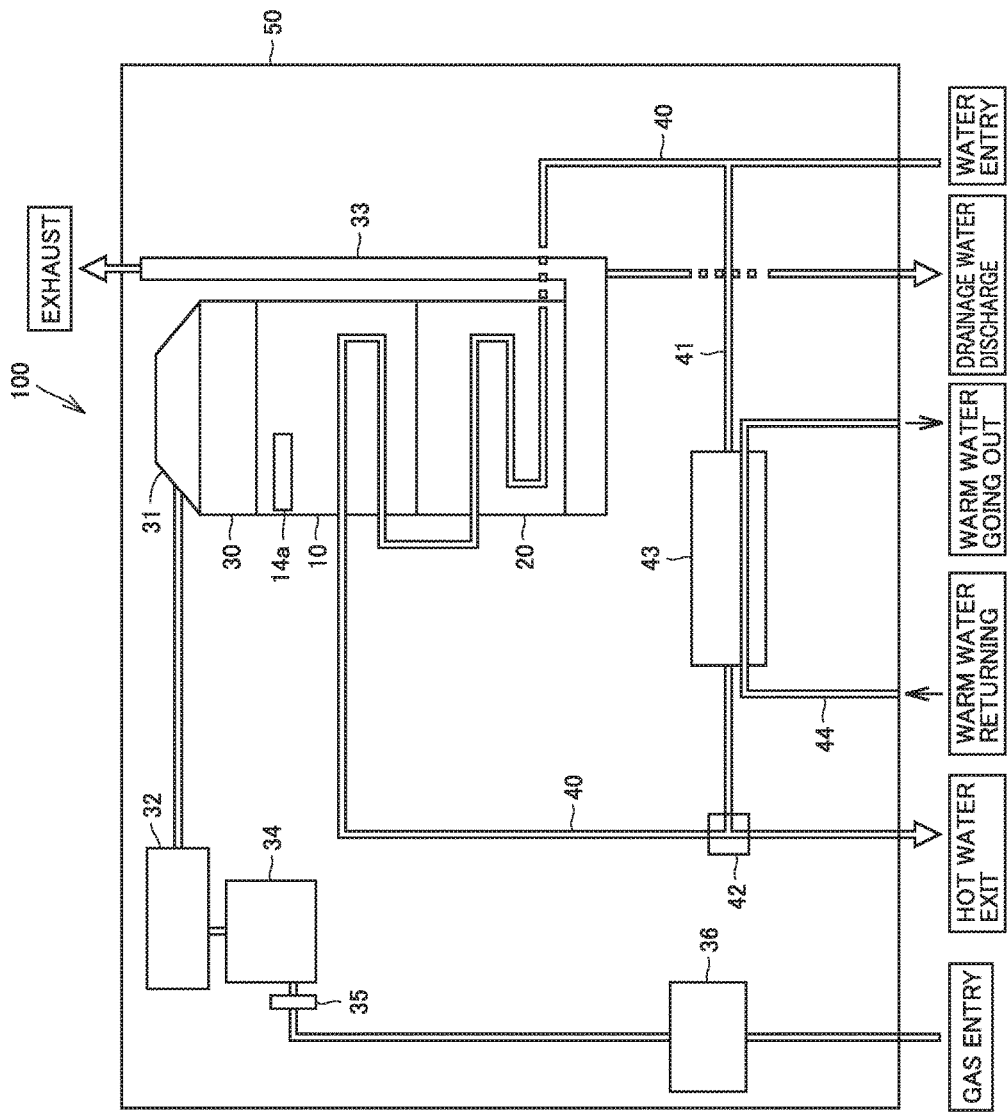
FIG. 1 is a diagram schematically showing a construction of a hot water apparatus in one embodiment of the present invention.

As shown in FIG. 1, a hot water apparatus 100 in the present embodiment mainly includes a sensible heat recovery heat exchanger (primary heat exchanger) 10, a latent heat recovery heat exchanger (secondary heat exchanger) 20, a combustion apparatus (burner) 30, a chamber 31, a fan assembly 32, a duct 33, a venturi 34, an orifice 35, a gas valve 36, a pipe 40, a bypass pipe 41, a three-way valve 42, a liquid to liquid heat exchanger 43, a hydronic pipe 44, and a housing 50. All of components except for housing 50 among the components above are disposed in housing 50.

Gas valve 36, orifice 35, and venturi 34 are connected to the pipe in this order. Fuel gas can be supplied from the outside of housing 50 to this pipe. The fuel gas supplied to this pipe flows to venturi 34 through gas valve 36 and orifice 35.

Gas valve 36 is configured to control a flow rate of the fuel gas. Venturi 34 is configured to increase a flow velocity of mixture gas by reducing the flow of the mixture gas of the fuel gas and air. Venturi 34 is constructed to take in air from the outside of housing 50. Venturi 34 is constructed to mix air taken in from the outside of housing 50 and the fuel gas supplied through the pipe.

Venturi 34 is connected to fan assembly 32 through the pipe. The mixture gas mixed in venturi 34 is sent through this pipe to fan assembly 32. Fan assembly 32 is configured to supply the mixture gas to combustion apparatus 30. Fan assembly 32 mainly includes a fan case, an impeller disposed in the fan case, and a drive source (such as a motor) for rotating the impeller.

Fan assembly 32 is connected to chamber 31 and chamber 31 is connected to combustion apparatus 30. The mixture gas supplied from fan assembly 32 is sent through chamber 31 to combustion apparatus 30.

Combustion apparatus 30 is configured to generate combustion gas which is combustion gas for heating by burning the mixture gas. Combustion apparatus 30 is an inverse combustion type apparatus which supplies combustion gas downward. The mixture gas issued from combustion apparatus 30 is ignited by an ignition plug 14a and becomes the combustion gas. Ignition plug 14a is provided in sensible heat recovery heat exchanger 10 as will be described later.

Combustion apparatus 30, sensible heat recovery heat exchanger 10, and latent heat recovery heat exchanger 20 are connected such that the combustion gas sequentially passes through sensible heat recovery heat exchanger 10 and latent heat recovery heat exchanger 20. Specifically, sensible heat recovery heat exchanger 10 is attached under combustion apparatus 30 and latent heat recovery heat exchanger 20 is attached under sensible heat recovery heat exchanger 10.

Duct 33 is connected to latent heat recovery heat exchanger 20 and duct 33 extends to the outside of housing 50. The combustion gas which has passed through latent heat recovery heat exchanger 20 is thus emitted to the outside of housing 50 through duct 33.

Each of sensible heat recovery heat exchanger 10 and latent heat recovery heat exchanger 20 is configured to heat water and/or hot water by exchanging heat between the combustion gas supplied from combustion apparatus 30 and water and/or hot water.

Sensible heat recovery heat exchanger 10 is configured to recover sensible heat of the combustion gas generated by combustion apparatus 30. Latent heat recovery heat exchanger 20 is configured to recover latent heat of the combustion gas. For example, a plate type heat exchanger is employed as latent heat recovery heat exchanger 20.

When a temperature of incoming water and/or hot water is low in sensible heat recovery heat exchanger 10 or when an amount of heating by combustion apparatus 30 is small, water vapor in the combustion gas is condensed in sensible heat recovery heat exchanger 10 and condensed water (drainage water) is produced. Drainage water is produced also in latent heat recovery heat exchanger 20. Drainage water is drained to the outside of housing 50 through a part of duct 33.

A heat transfer tube of sensible heat recovery heat exchanger 10 and a heat transfer tube of latent heat recovery heat exchanger 20 are connected to each other through pipe 40. A part of pipe 40 on a water entry side relative to latent heat recovery heat exchanger 20 and a part of pipe 40 on a hot water exit side relative to sensible heat recovery heat exchanger 10 are bypassed by bypass pipe 41.

The part of pipe 40 on the hot water exit side relative to sensible heat recovery heat exchanger 10 and bypass pipe 41 are connected to each other by three-way valve 42. Three-way valve 42 is constructed to be able to switch between a flow path from sensible heat recovery heat exchanger 10 to a hot water outlet of pipe 40 and a flow path from sensible heat recovery heat exchanger 10 to bypass pipe 41.

Liquid to liquid heat exchanger 43 is connected to bypass pipe 41. Hydronic pipe 44 connected to a hydronic terminal is inserted in liquid to liquid heat exchanger 43. Liquid to liquid heat exchanger 43 is constructed such that warm water warmed as a result of passage through sensible heat recovery heat exchanger 10 and latent heat recovery heat exchanger 20 flows in liquid to liquid heat exchanger 43. As warm water which flows in liquid to liquid heat exchanger 43 flows outside hydronic pipe 44, heat can be exchanged between warm water which flows in liquid to liquid heat exchanger 43 and warm water which flows in hydronic pipe 44.

Water supplied to hot water apparatus 100 becomes hot as a result of heat exchange with the combustion gas in sensible heat recovery heat exchanger 10 and latent heat recovery heat exchanger 20. Hot water can thus be supplied by hot water apparatus 100.

Warm water which returns from the hydronic terminal passes through hydronic pipe 44 to be warmed as a result of heat exchange with warm water warmed by sensible heat recovery heat exchanger 10 and latent heat recovery heat exchanger 20 in liquid to liquid heat exchanger 43 and thereafter it is supplied again to the hydronic terminal. Warm water can thus be supplied to the hydronic terminal by hot water apparatus 100.

A construction of sensible heat recovery heat exchanger 10 included in hot water apparatus 100 will now be described with reference to FIGS. 2 and 3.

Figure 2:
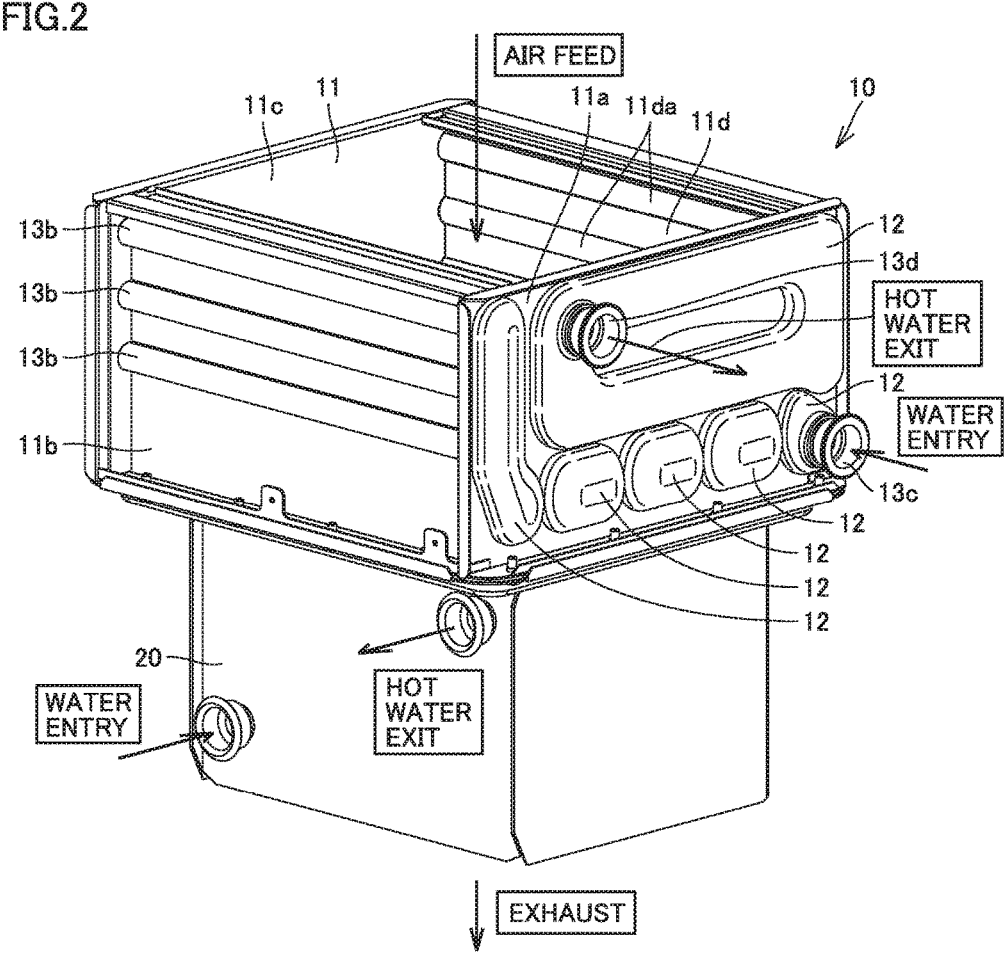
FIG. 2 is a perspective view schematically showing a construction of a sensible heat recovery heat exchanger and a latent heat recovery heat exchanger in one embodiment of the present invention.

As shown in FIG. 2, sensible heat recovery heat exchanger 10 in the present embodiment mainly includes a case 11, a header 12, heat transfer tubes (heat absorption pipes: FIGS. 3) 13a and 13b, and a fin 1 (FIG. 3).

Case 11 includes a first sidewall 11a, a second sidewall 11b, a third sidewall 11c, and a fourth sidewall 11d. First sidewall 11a to fourth sidewall 11d are connected to form a quadrangular frame.

First sidewall 11a and third sidewall 11c face each other. Second sidewall 11b and fourth sidewall 11d face each other. Each of first sidewall 11a to fourth sidewall 11d has a wall surface serving as a partition between the inside and the outside of case 11.

Case 11 in a form of the frame opens upward and downward. The combustion gas can thus be supplied to the inside of case 11 through the upper opening of case 11. The combustion gas can be exhausted to the outside of case 11 through the lower opening of case 11.

Header 12 is provided on an outer surface of first sidewall 11a. A joint 13c on the water entry side and a joint 13d on the hot water exit side are attached to header 12 provided on the outer surface of first sidewall 11a. A not-shown header is provided also on an outer surface of third sidewall 11c. Header 12 provided on the outer surface of first sidewall 11a and header 12 provided on the outer surface of third sidewall 11c are connected to each other through a plurality of heat transfer tubes 13a and 13b.

Figure 3:
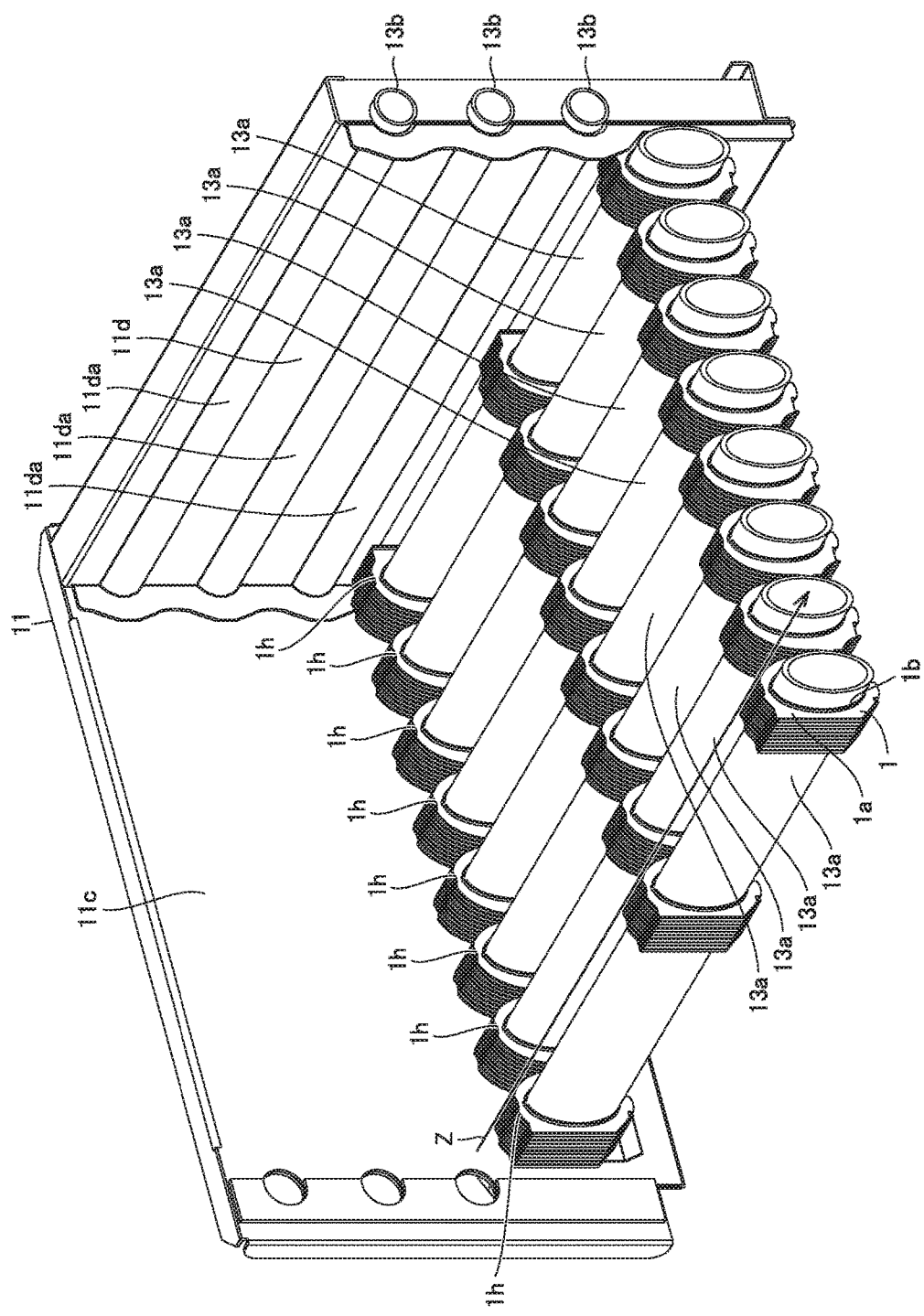
FIG. 3 is a perspective view showing an internal construction of the sensible heat recovery heat exchanger shown in FIG. 2.

As shown in FIG. 3, the plurality of heat transfer tubes 13a and 13b include heat transfer tubes 13a located inside case 11 and heat transfer tubes 13b located outside case 11. Heat transfer tube 13a has, for example, an elliptical lateral cross-sectional shape. The lateral cross-sectional shape means a cross-sectional shape in a direction orthogonal to a direction of extension of heat transfer tube 13a. Each of heat transfer tubes 13a and 13b is composed, for example, of a material such as stainless steel.

Each of second sidewall 11b and fourth sidewall 11d is provided with a recess 11da recessed from the outside toward the inside of case 11. Heat transfer tube 13b located outside case 11 is fitted into recess 11da.

A flow of water and/or hot water which flows through headers 12 and heat transfer tubes 13a and 13b is, for example, as follows.

As shown in FIGS. 2 and 3, water and/or hot water which comes in from joint 13c on the water entry side enters heat transfer tube 13a located in the inside of case 11 through header 12 provided on a side closest to one end of the outer surface of first sidewall 11a. Water and/or hot water which enters heat transfer tube 13a reaches not-shown header 12 provided on the outer surface of third sidewall 11c. Water and/or hot water which reaches header 12 provided on the outer surface of third sidewall 11c reaches header 12 provided on the outer surface of first sidewall 11a through another heat transfer tube 13a connected to header 12.

Thus, water and/or hot water moves from a side of first sidewall 11a toward third sidewall 11c and thereafter turns back from the side of third sidewall 11c toward first sidewall 11a. Thereafter, water and/or hot water flows as repeating turning back toward third sidewall 11c and turning back toward first sidewall 11a.

As shown in FIG. 2, water and/or hot water which reaches header 12 provided on a side closest to the other end of the outer surface of first sidewall 11a reaches header 12 provided on the outer surface of third sidewall 11c through heat transfer tube 13b provided on an outer surface of second sidewall 11b.

Water and/or hot water which reaches header 12 provided on the outer surface of third sidewall 11c reaches header 12 provided on the outer surface of first sidewall 11a through heat transfer tube 13b provided on an outer surface of fourth sidewall 11d shown in FIG. 3 and finally exits from joint 13d on the side of hot water.

As shown in FIG. 3, a plurality of fins 1 are connected to outer circumferential surfaces of heat transfer tubes 13a located in the inside of case 11. FIG. 3 shows only some of the plurality of fins 1 for the sake of brevity of illustration.

Figure 4:
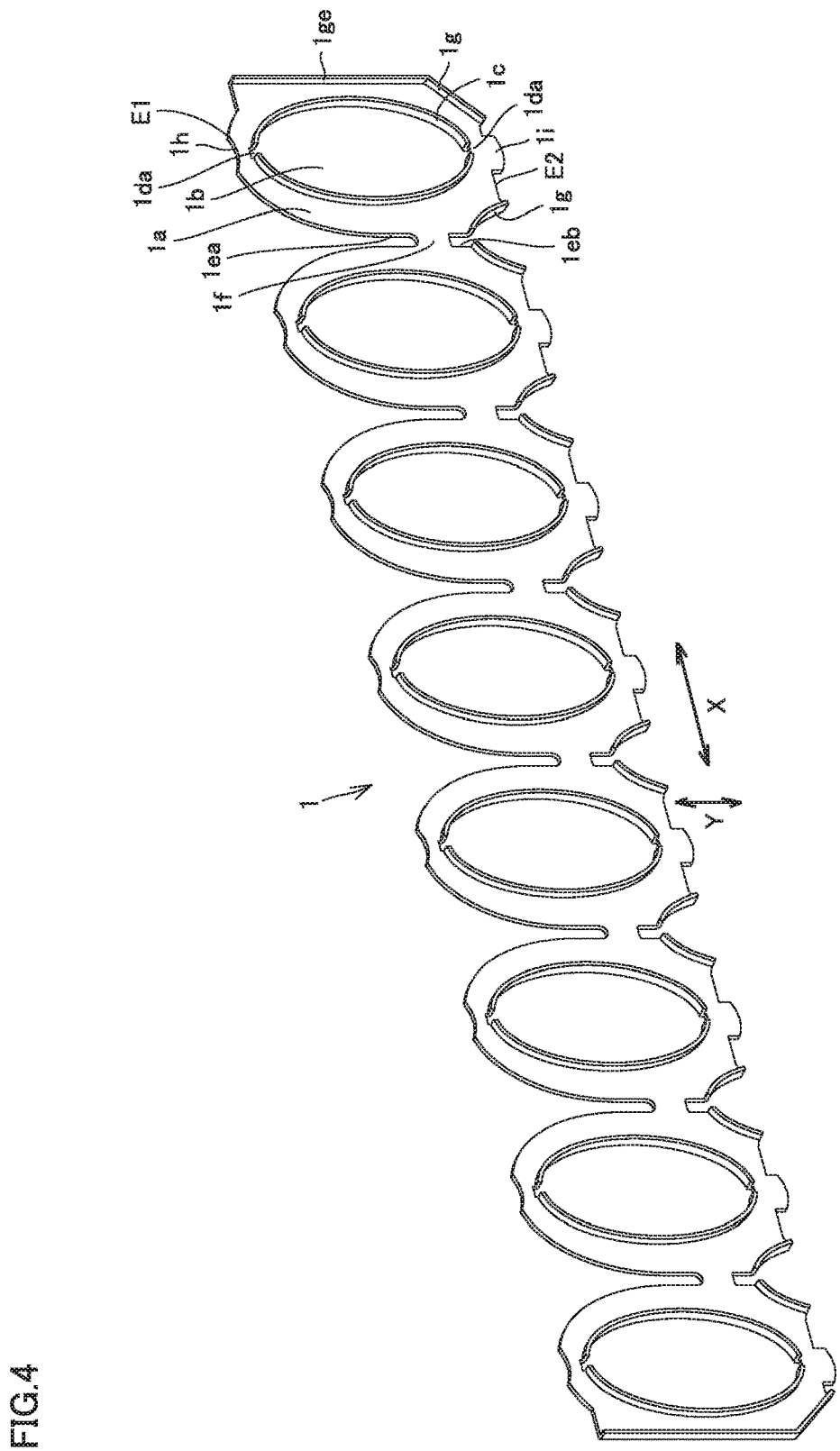
FIG. 4 is a perspective view showing a construction of a fin included in the sensible heat recovery heat exchanger shown in FIG. 3.

As shown in FIG. 4, fin 1 is formed, for example, by working one flat plate made of stainless steel. Fin 1 mainly includes a flat portion 1a, a plurality of insertion holes 1b, a burring wall portion 1c, a first slit 1ea, a second slit 1eb, a cut and raised wall portion 1g, a recess 1h, and a protrusion 1i.

The plurality of insertion holes 1b are disposed as being aligned in a single row in a first direction (a direction shown with an arrow X). Each of the plurality of insertion holes 1b passes through flat portion 1a from a front surface to a rear surface. Each of the plurality of insertion holes 1b is in an elliptical shape in a front view. The front view means a point of view in a direction orthogonal to the front surface of flat portion 1a.

Fin 1 has a first end portion E1 and a second end portion E2 opposed to each other in a second direction (a direction shown with an arrow Y) intersecting with first direction X. Second direction Y is, for example, orthogonal to first direction X.

Burring wall portion 1c is disposed around each of the plurality of insertion holes 1b. Burring wall portion 1c is a portion erected from flat portion 1a by bending flat portion 1a. Burring wall portion 1c has a notch 1da.

Figure 5:
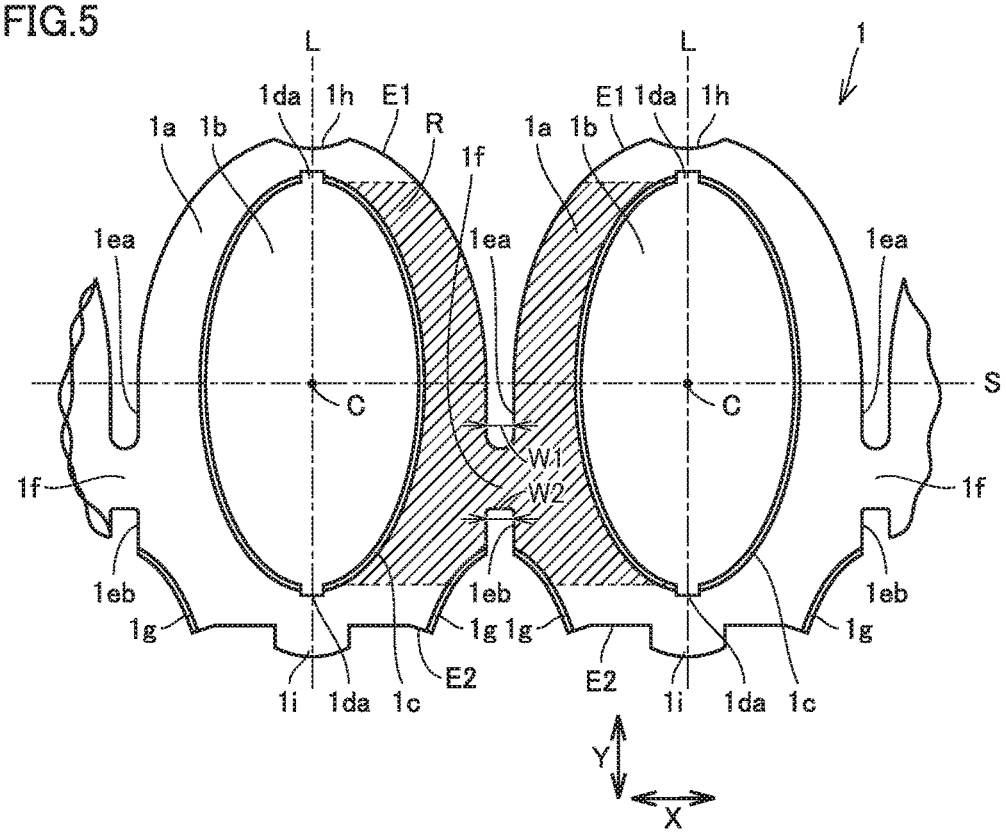
FIG. 5 is an enlarged front view showing a portion around two insertion holes in the fin shown in FIG. 4, as being enlarged.

As shown in FIG. 5, when a virtual straight line (a centerline S) which extends in first direction X and passes through a center C of the circular shape of insertion hole 1b and a normal (a chain dotted line L) which passes through center C of the circular shape and is orthogonal to virtual straight line S are assumed, notch 1da in burring wall portion 1c is disposed in a portion where normal L passes. When insertion hole 1b is in the elliptical shape, notch 1da in burring wall portion 1c is disposed in a portion where a major axis (chain dotted line L) of elliptical insertion hole 1b passes. Specifically, notch 1da is disposed in a portion of burring wall portion 1c where major axis L passes, on each of a side of first end portion E1 and a side of second end portion E2. Burring wall portion 1c is thus divided into two parts with major axis L being defined as a boundary.

First slit 1ea extends from first end portion E1 toward second end portion E2 of fin 1. Second slit 1eb extends from second end portion E2 toward first end portion E1 of fin 1. Both of first slit 1ea and second slit 1eb have an edge portion where no cut and raised wall portion 1g is disposed.

The edge portion where no cut and raised wall portion 1g is disposed means that flat portion 1a is not bent at the edge portion. Therefore, in the edge portion where no cut and raised wall portion 1g is disposed, flat portion 1a terminates as being flat.

Second slit 1eb has a portion which is curved in a front view on the side of second end portion E2 and a portion which linearly extends in the front view on the side of first end portion E1. Cut and raised wall portion 1g is disposed in the edge portion of the curved portion of second slit 1eb. No cut and raised wall portion 1g is disposed in the edge portion of the linearly extending portion of second slit 1eb. Second slit 1eb has a first edge portion (curved portion) where cut and raised wall portion 1g is disposed and a second edge portion (linearly extending portion) where no cut and raised wall portion 1g is disposed.

Cut and raised wall portion 1g is a portion which is erected from flat portion 1a by bending flat portion 1a. Cut and raised wall portion 1g is bent, for example, in a direction the same as burring wall portion 1c. Cut and raised wall portion 1g has a portion 1ge located at an end portion in first direction X of fin 1.

The first edge portion of second slit 1eb where cut and raised wall portion 1g is disposed has a curved front shape (the shape in the front view) which projects from second end portion E2 toward first end portion E1.

A length of extension of first slit 1ea from first end portion E1 toward second end portion E2 of fin 1 is longer than a length of extension of second slit 1eb from second end portion E2 toward first end portion E1 of fin 1. First slit 1ea has a tip end located on the side of second end portion E2 relative to the centerline (chain dotted line S) which connects centers C of two elliptical insertion holes 1b to each other. Centerline S extends in the first direction. Second slit 1eb has a tip end located on the side of second end portion E2 relative to centerline S. Second slit 1eb does not extend beyond centerline S from the side of second end portion E2 toward first end portion E1.

First slit 1ea has a width W1 decreasing from first end portion E1 of fin 1 until centerline S as it is closer toward second end portion E2 from first end portion E1. First slit 1ea maintains the same width W1 from centerline S until the tip end on the side of second end portion E2. Cut and raised wall portion 1g is not disposed over first slit 1ea at all.

Each of the tip end of first slit 1ea and the tip end of second slit 1eb is located in a region (a hatched region R in FIG. 5) lying between two insertion holes 1b. Width W1 along first direction X at a tip end portion of first slit 1ea is set to be equal in dimension to a width W2 along first direction X at a tip end portion of second slit 1eb.

A portion of flat portion 1a lying between the tip end of first slit 1ea and the tip end of second slit 1eb is defined as a connection portion if which connects portions of flat portion 1a around two adjacent insertion holes 1b.

When a virtual straight line (centerline S) which extends in first direction X and passes through center C of circular insertion hole 1b and the normal (chain dotted line L) which passes through center C of the circular shape and is orthogonal to virtual straight line S are assumed, recess $1h$ is disposed in first end portion E1 of fin 1 where the normal (chain dotted line L) passes. When insertion hole $1b$ is in the elliptical shape, the recess is disposed in a portion where major axis L of elliptical insertion hole $1b$ passes. Recess $1h$ is recessed from an edge of first end portion E1 of fin 1 toward insertion hole $1b$. Recess $1h$ has, for example, a curved shape which projects from the side of first end portion E1 toward insertion hole $1b$ in the front view.

Protrusion $1i$ is disposed in second end portion E2 of fin 1 where the normal (chain dotted line L) passes. When insertion hole $1b$ is in the elliptical shape, the protrusion is disposed in a portion where major axis L of elliptical insertion hole $1b$ passes. Protrusion $1i$ has a tip end, for example, in a curved shape which projects from the side of second end portion E2 toward a side opposite to insertion hole $1b$ in the front view. The curved shape of the tip end of protrusion $1i$ is the same as the curved shape of recess $1h$.

Second end portion E2 is located downstream from first end portion E1 in a direction of flow of the combustion gas. Since protrusion $1i$ is formed in second end portion E2 on a downstream side in the direction of flow of the combustion gas, heat exchange capability and durability of fin 1 are better than in an example where protrusion $1i$ is formed in first end portion E1 on an upstream side in the direction of flow of the combustion gas.

A method of manufacturing sensible heat recovery heat exchanger 10 in the present embodiment will now be described.

Figure 6:
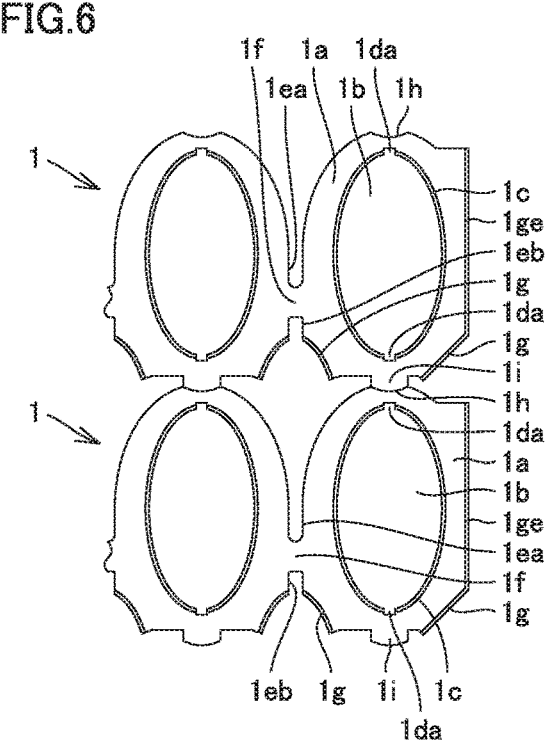
FIG. 6 is a diagram for illustrating a method of manufacturing a fin.

Initially, fin 1 is formed. As shown in FIG. 6, fin 1 is formed by cutting one flat plate made of stainless steel in such a state that portions to form a plurality of fins 1 are integral. As a result of cutting, fin 1 shown in FIGS. 4 and 5 is formed. As a result of cutting, recess $1h$ and protrusion $1i$ of fin 1 are formed.

As shown in FIG. 3, heat transfer tubes $13a$ are press-fitted into insertion holes $1b$ in fins 1. A plurality of heat transfer tubes $13a$ are thus connected to the plurality of fins 1. In this state, a brazing material paste is applied to recess $1h$ of fin 1. The brazing material paste is successively applied to recesses $1h$ in the plurality of fins 1 along a direction of extension of heat transfer tube $13a$ (a direction shown with an arrow Z).

As shown in FIG. 5, the brazing material paste applied to recess $1h$ reaches a portion of connection between fin 1 and heat transfer tube $13a$ from recess $1h$ through notch $1da$ in burring wall portion $1c$. The brazing material thus brazes fin 1 and heat transfer tube $13a$ to each other.

As shown in FIG. 3, after fin 1 and heat transfer tube $13a$ are brazed to each other, heat transfer tube $13a$ is connected to first sidewall $11a$ and third sidewall $11c$ which form case 11. In connection here, second sidewall $11b$ and fourth sidewall $11d$ to which heat transfer tubes $13b$ are attached lie between first sidewall $11a$ and third sidewall $11c$. As each portion is thus connected, sensible heat recovery heat exchanger 10 in the present embodiment is manufactured.

Functions and effects of the present embodiment will now be described in comparison with a comparative example shown in FIGS. 7 and 8.

Figure 7:
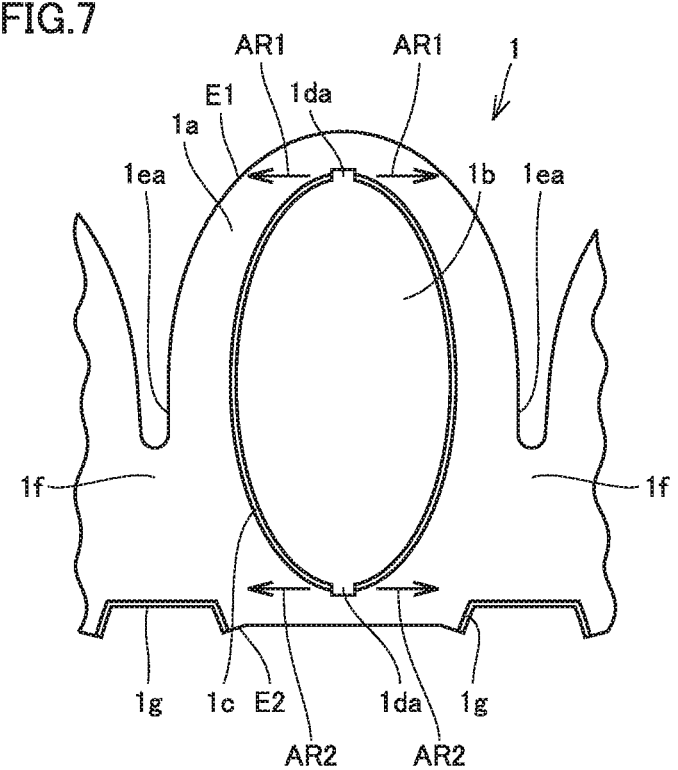
FIG. 7 is an enlarged front view showing a portion around one insertion hole in a fin in a comparative example, as being enlarged.
Figure 8:
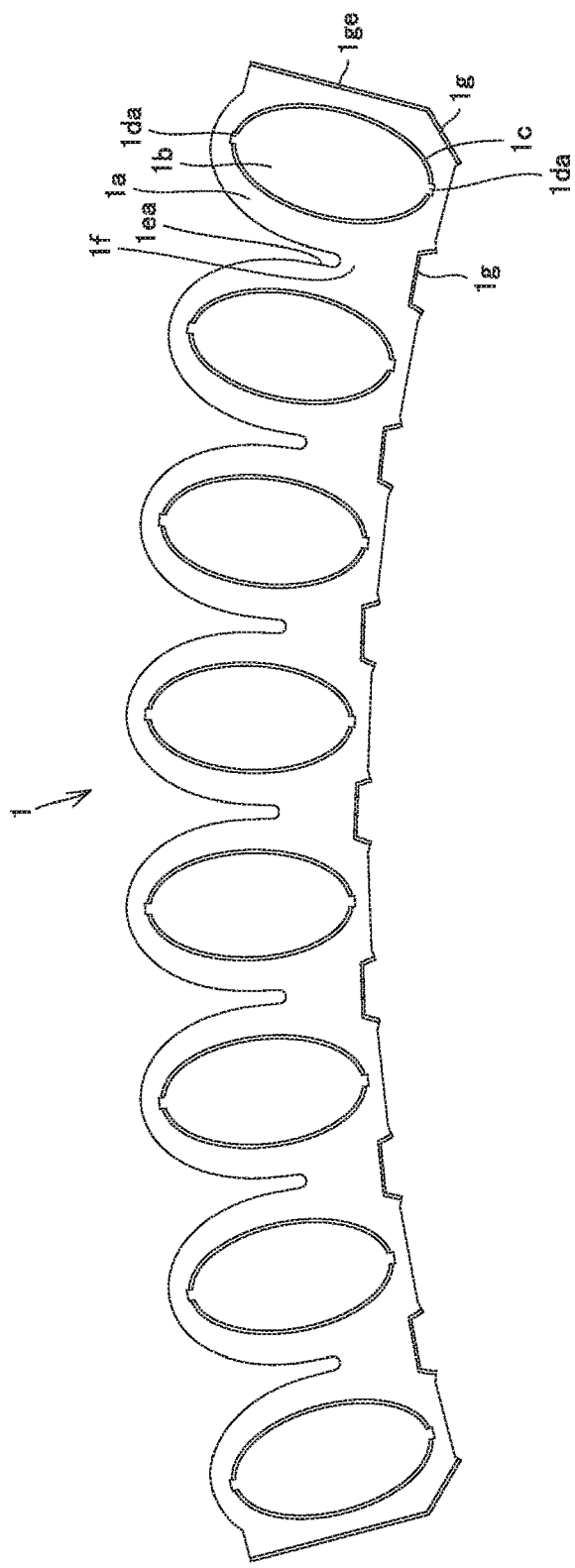
FIG. 8 is a front view showing warpage of the fin in the comparative example.

A construction of fin 1 in a comparative example shown in FIG. 7 is different from the construction in the embodiment shown in FIGS. 4 and 5 mainly in that cut and raised wall portion $1g$ is provided whereas no slit is provided in second end portion E2. A portion of the construction of fin 1 in the comparative example which corresponds to the feature in the embodiment shown in FIGS. 4 and 5 has the same reference character allotted as in the embodiment.

In fin 1 in the comparative example, cut and raised wall portion $1g$ is provided but no slit is provided in second end portion E2. Therefore, when a heat transfer tube is press-fitted in insertion hole $1b$ in fin 1 in the comparative example, the side of first end portion E1 of fin 1 tends to spread in a direction shown with an arrow AR1 whereas the side of second end portion E2 is less likely to spread in a direction shown with an arrow AR2 as being restricted by cut and raised wall portion $1g$. As first end portion E1 of fin 1 spreads more than second end portion E2 as a result of press-fitting of the heat transfer tube, fin 1 warps as shown in FIG. 8.

When fin 1 warps, a dimension such as a pitch between heat transfer tubes connected to fin 1 is different from a designed value. In this case, as shown in FIG. 3, an assembly error is caused when the heat transfer tube is connected to first sidewall $11a$ and third sidewall $11c$ of case 11 and assembly becomes difficult.

In contrast, in the present embodiment, as shown in FIGS. 4 and 5, second slit $1eb$ has the first edge portion where cut and raised wall portion $1g$ is disposed. Therefore, cut and raised wall portion $1g$ can deflect a flow of the combustion gas (combustion gas for heating) in a direction along the surface of heat transfer tube $13a$. Efficiency in heat exchange is thus improved.

Second slit $1eb$ has the second edge portion where no cut and raised wall portion $1g$ is disposed. Therefore, when heat transfer tube $13a$ is inserted in insertion hole $1b$, fin 1 is less likely to be restricted by cut and raised wall portion $1g$ and more likely to extend in second end portion E2. Fin 1 can thus extend substantially equally on the side of first end portion E1 and the side of second end portion E2. Extension as being uneven between the side of first end portion E1 and the side of second end portion E2 can be suppressed. Therefore, warpage of fin 1 is suppressed and assembly of sensible heat recovery heat exchanger 10 is facilitated.

As shown in FIG. 5, first slit $1ea$ has the tip end located on the side of second end portion E2 relative to centerline S which connects centers C of two elliptical insertion holes $1b$ to each other. When first end portion E1 is disposed upstream from second end portion E2 in a flow of the combustion gas, the combustion gas is thus more likely to exchange heat with water and/or hot water in heat transfer tube $13a$.

When first slit $1ea$ has the tip end located on the side of second end portion E2 relative to centerline S, the side of first end portion E1 in particular is more likely to extend and warpage of fin 1 is more likely in insertion of heat transfer tube $13a$ in insertion hole $1b$. In the present embodiment, however, second slit $1eb$ extending from second end portion E2 has the second edge portion without cut and raised wall portion $1g$. Therefore, even when first slit $1ea$ is in a shape which tends to cause warpage of fin 1 as above, warpage of fin 1 can be suppressed by second slit $1eb$. The construction that second slit $1eb$ has the second edge portion without cut and raised wall portion $1g$ can effectively suppress warpage of fin 1 when first slit $1ea$ extends further than second slit $1eb$.

Insertion hole $1b$ is in the elliptical shape and first slit $1ea$ extends from one side toward the other side of major axis L of the elliptical shape. Thus, a length of first slit $1ea$ is longer than in an example where insertion hole $1b$ is in a shape of a perfect circle. As first slit $1ea$ thus has a longer length, the side of first end portion E1 in particular tends to extend and warpage of fin 1 is more likely in insertion of heat transfer tube $13a$ in insertion hole $1b$. In the present embodiment, however, second slit $1eb$ extending from second end portion E2 has the second edge portion without cut and raised wall portion 1g. Therefore, even when first slit 1ea and insertion hole 1b are in a shape which tends to cause warpage of fin 1 as above, warpage of fin 1 can be suppressed by second slit 1eb. The construction that second slit 1eb has the second edge portion without cut and raised wall portion 1g can effectively suppress warpage of fin 1 when insertion hole 1b is in the elliptical shape and first slit 1ea extends further than second slit 1eb.

As shown in FIG. 5, second slit 1eb has the tip end located in region R lying between two insertion holes 1b. When heat transfer tube 13a is press-fitted in insertion hole 1b in fin 1, second slit 1eb thus tends to accommodate deformation of fin 1.

As shown in FIG. 5, cut and raised wall portion 1g is disposed in the first edge portion on the side of second end portion E2 of second slit 1eb. Cut and raised wall portion 1g can more effectively bring the combustion gas into contact with heat transfer tube 13a and efficiency in heat exchange can be improved.

As shown in FIG. 5, the first edge portion of second slit 1eb where cut and raised wall portion 1g is disposed has a curved front shape which projects from second end portion E2 toward first end portion E1. A height of projection of cut and raised wall portion 1g can thus be great while width W2 of the tip end portion of second slit 1eb is kept small, which will be described below in comparison with a comparative example shown in FIG. 9 and a comparative example shown in FIG. 10.

Figure 9:
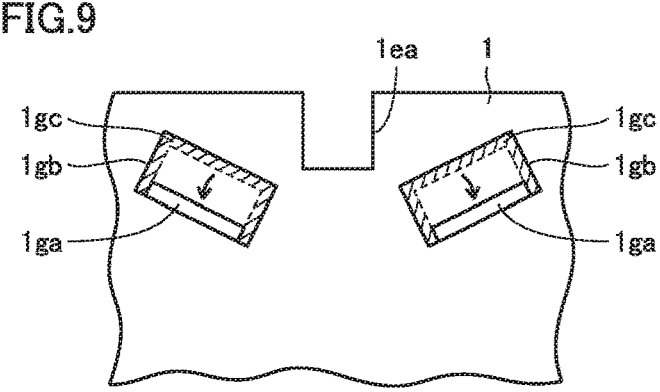
FIG. 9 is a partially enlarged front view showing a construction of a first comparative example of a cut and raised wall portion.

As shown in FIG. 9, if a region 1gb of flat portion 1a of fin 1 is punched to form a cut and raised wall portion 1ga, a waste material by a dimension (a hatched region 1gc) of a die for punching is produced. In this case, a height of projection of cut and raised wall portion 1ga decreases by the dimension (hatched region 1gc) of the die.

Figure 10:
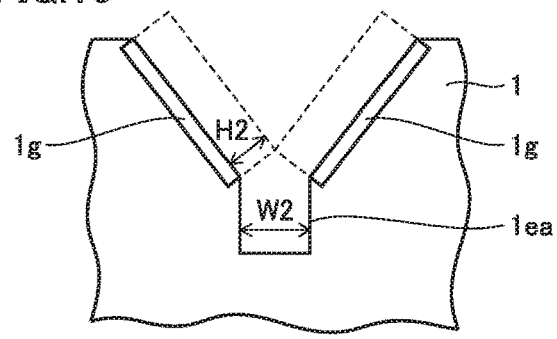
FIG. 10 is a partially enlarged front view showing a construction of a second comparative example of a cut and raised wall portion.

As shown in FIG. 10, if an edge portion where cut and raised wall portion 1g is disposed has a linear front shape, a height H2 of projection of cut and raised wall portion 1g cannot be great, because portions (portions shown with a dashed line) to define cut and raised wall portions 1g which extend from opposing sides with second slit 1eb lying therebetween tend to interfere with each other.

In order to suppress interference between the portions (the portions shown with the dashed line) to define cut and raised wall portions 1g in the construction in FIG. 10, width W2 of second slit 1eb should be increased. When width W2 of second slit 1eb is increased, however, a dimension of fin 1 increases and a dimension of sensible heat recovery heat exchanger 10 increases.

Figure 11:
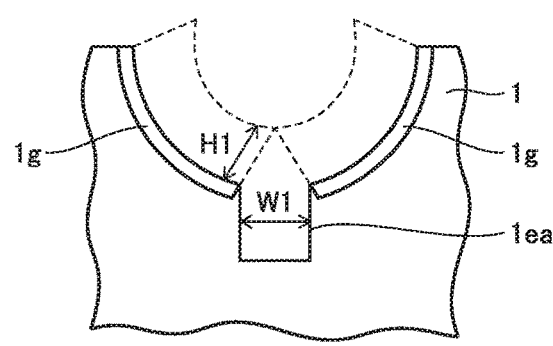
FIG. 11 is a partially enlarged front view for illustrating that a height of projection of a cut and raised wall portion of a fin included in the sensible heat recovery heat exchanger shown in FIG. 3 can be increased.

In contrast, in the present embodiment, the first edge portion of second slit 1eb where cut and raised wall portion 1g is disposed has a curved front shape. Thus, portions (portions shown with the dashed line) to define cut and raised wall portions 1g which extend from opposing sides with second slit 1eb lying therebetween are less likely to interfere with each other than in the example shown in FIG. 10. Thus, as shown in FIG. 11, in the present embodiment, height H1 of projection of cut and raised wall portion 1g can be greater while width W2 of the tip end portion of second slit 1eb is kept small. Unlike working as shown in FIG. 9, there is no waste material produced by punching either.

As shown in FIG. 5, burring wall portion 1c is disposed around each of the plurality of insertion holes 1b. Burring wall portion 1c has notch 1da in the portion where major axis L of elliptical insertion hole 1b passes. Thus, in press-fitting heat transfer tube 13a in insertion hole 1b in fin 1, burring wall portion 1c can spread with notch 1da being defined as the boundary so that resistance in press-fitting of heat transfer tube 13a can be lowered.

As shown in FIG. 5, fin 1 has recess 1h recessed from the edge of fin 1 toward insertion hole 1b in the portion where major axis L of elliptical insertion hole 1b passes. Recess 1h facilitates application of a brazing material directly above insertion hole 1b. The brazing material flows down from recess 1h so that joint between heat transfer tube 13a inserted through insertion hole 1b and fin 1 with the brazing material is facilitated.

As shown in FIG. 5, width W1 along first direction X at the tip end portion of first slit 1ea is set to be equal in dimension to width W2 along first direction X at the tip end portion of second slit 1eb. Design is thus facilitated.

According to the method of manufacturing a heat exchanger in the present embodiment, warpage of fin 1 in press-fitting of heat transfer tube 13a in fin 1 can be suppressed.

As shown in FIG. 5, according to the method of manufacturing a heat exchanger in the present embodiment, recess 1h facilitates application of a brazing material directly above insertion hole 1b. The brazing material flows down from recess 1h through notch 1da in burring wall portion 1c to a portion in between heat transfer tube 13a and fin 1 so that joint between heat transfer tube 13a inserted through insertion hole 1b and fin 1 with the brazing material is facilitated.

Though an example in which the lateral cross-sectional shape of heat transfer tube 13a and a shape of insertion hole 1b in the front view are elliptical has been described above, the lateral cross-sectional shape of heat transfer tube 13a and the shape of insertion hole 1b in the front view may be circular other than elliptical and it may be, for example, in a perfect circle.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A heat exchanger comprising:
   a heat transfer tube; and
   a fin having a plurality of insertion holes in a circular shape through which the heat transfer tube is inserted and containing stainless steel as a material,
   the plurality of insertion holes being disposed as being aligned in a single row in a first direction,
   the plurality of insertion holes aligned in the single row including a first insertion hole and a second insertion hole adjacent to each other,
   the fin having a first end portion and a second end portion opposed to each other in a second direction intersecting with the first direction,
   the fin having a first slit extending from the first end portion toward the second end portion and a second slit extending from the second end portion toward the first end portion, and
   the second slit having a first edge portion where a cut and raised wall portion is disposed and a second edge portion where no cut and raised wall portion is disposed,
   wherein
   the first slit has a tip end located in a region lying between the first insertion hole and the second insertion hole and located on a side of the second end portion relative to a centerline which connects a center of the circular shape of the first insertion hole and a center of the circular shape of the second insertion hole to each other.

2. The heat exchanger according to claim 1, wherein the second slit has a tip end located in a region lying between the first insertion hole and the second insertion hole.

3. The heat exchanger according to claim 1, wherein the second slit has the first edge portion located closer to the second end portion than the second edge portion of the second slit.

4. The heat exchanger according to claim 3, wherein the first edge portion has a curved front shape which projects from the second end portion toward the first end portion.

5. The heat exchanger according to claim 1, wherein a burring wall portion is disposed around each of the plurality of insertion holes, and
when a virtual straight line which extends in the first direction and passes through a center of the circular shape of the insertion hole and a virtual normal which passes through the center of the circular shape and is orthogonal to the virtual straight line are assumed, the burring wall portion has a notch in a portion where the virtual normal passes.

6. The heat exchanger according to claim 5, wherein the fin has a recess recessed from an edge of the fin toward the insertion hole in a portion where the virtual normal passes.

7. The heat exchanger according to claim 1, wherein a width along the first direction at a tip end portion of the first slit is set to be equal in dimension to a width along the first direction at a tip end portion of the second slit.

8. A hot water apparatus comprising:
the heat exchanger according to claim 1; and
a burner which generates combustion gas for heating with which heat is exchanged by the heat exchanger.

9. A method of manufacturing the heat exchanger according to claim 1, the method comprising:
press-fitting the heat transfer tube in the insertion hole in the fin; and
brazing the heat transfer tube to the fin.

10. The method of manufacturing the heat exchanger according to claim 9, wherein
the fin is prepared to have a burring wall portion around each of the plurality of insertion holes and to have a recess,
when a virtual straight line which extends in the first direction and passes through a center of the circular shape of the insertion hole and a virtual normal which passes through the center of the circular shape and is orthogonal to the virtual straight line are assumed, the burring wall portion is formed to have a notch in a portion where the virtual normal passes,
the recess is formed to be recessed from an edge of the fin toward the insertion hole in a portion where the virtual normal passes, and
the brazing the heat transfer tube includes feeding a brazing material from the recess through the notch in the burring wall portion to a portion in between the heat transfer tube and the fin.

11. The heat exchanger according to claim 1, wherein the second end portion is located on a downstream side from the first end portion in a direction of flow of a combustion gas.

* * * * *